United States Patent
Bethea et al.

(10) Patent No.: US 8,247,487 B2
(45) Date of Patent: Aug. 21, 2012

(54) TIRE WITH TREAD CONTAINING CARBOXYLATED STYRENE/BUTADIENE RUBBER

(75) Inventors: Robert Anthony Bethea, North Canton, OH (US); Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 21 days.

(21) Appl. No.: 12/944,196

(22) Filed: Nov. 11, 2010

(65) Prior Publication Data

US 2012/0123017 A1    May 17, 2012

(51) Int. Cl.
*C08K 3/04*        (2006.01)
*C08J 5/14*        (2006.01)

(52) U.S. Cl. ........................................ 524/495; 523/157

(58) Field of Classification Search ................... 524/495
See application file for complete search history.

(56) References Cited

U.S. PATENT DOCUMENTS

| 4,398,582 A | 8/1983 | Yuto et al. ................. 152/209 R |
| 5,462,979 A | 10/1995 | Sandstrom ..................... 523/438 |
| 5,488,077 A | 1/1996 | Sandstrom ..................... 523/438 |
| 5,489,627 A | 2/1996 | Sandstrom ..................... 523/213 |
| 5,489,628 A | 2/1996 | Sandstrom ..................... 523/213 |
| 6,218,473 B1 * | 4/2001 | Sandstrom ..................... 525/191 |
| 6,365,668 B1 * | 4/2002 | Scholl et al. .................. 524/575 |
| 6,852,794 B2 * | 2/2005 | Puhala et al. .................. 524/588 |
| 7,144,465 B2 | 12/2006 | Nanni et al. ................ 156/110.1 |
| 7,816,483 B2 | 10/2010 | Hogan et al. .................. 528/125 |
| 2003/0195288 A1 | 10/2003 | Robert et al. .................. 524/492 |
| 2011/0048599 A1 * | 3/2011 | Ryba et al. .................. 152/209.5 |

FOREIGN PATENT DOCUMENTS

| EP | 601611 | 12/1993 |
| EP | 704481 | 4/1996 |
| EP | 1493597 | 1/2005 |
| EP | 2098384 | 9/2009 |
| KR | 20040089349 | 10/2004 |
| KR | 20110033322 | 3/2011 |
| WO | 2005/056665 | 6/2005 |

OTHER PUBLICATIONS

European Search Report completed Mar. 20, 2012.

* cited by examiner

*Primary Examiner* — Hui Chin
(74) *Attorney, Agent, or Firm* — Henry C. Young, Jr.

(57) ABSTRACT

This invention relates to a tire with a tread of a rubber composition containing carboxylated styrene/butadiene rubber.

7 Claims, No Drawings

TIRE WITH TREAD CONTAINING CARBOXYLATED STYRENE/BUTADIENE RUBBER

FIELD OF THE INVENTION

This invention relates to a tire with a tread of a rubber composition containing carboxylated styrene/butadiene rubber.

BACKGROUND OF THE INVENTION

Vehicular tires typically have treads of rubber compositions comprised of selected elastomers and particulate reinforcing fillers.

Such elastomers may typically include cis 1,4-polybutadiene rubber to promote, for example, resistance to treadwear, styrene/butadiene rubber to promote, for example, wet traction and sometimes natural rubber to promote, for example, heat durability for the tire tread. Sometimes functionalized elastomers have been proposed such as, for example amine and siloxy functionalized styrene/butadiene rubbers. For example, see U.S. Pat. No. 7,816,483.

For this invention, however, an emphasis is placed on providing a tire tread which might be suitable, for example, for a tire in which tread traction (e.g. skid resistance) is most important and resistance to tread wear is of lesser importance such as, for example, for a vehicle which may be desired to travel at relatively high speeds.

For such purpose, it is proposed that the rubber composition be exclusive of any appreciable amount of, and preferably exclusive of, cis 1,4-polybutadiene rubber and natural rubber.

For such purpose, it is proposed that a rubber composition for a tire tread be evaluated for which its elastomer constituent is limited to a functionalized elastomer such as, for example, a carboxylated nitrile rubber (x-NBR) or carboxylated styrene/butadiene rubber (x-SBR).

In the description of this invention, the terms "rubber" and "elastomer" if used herein, may be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

The term "phr" where used herein, and according to conventional practice, refers to "parts of a respective material per 100 parts by weight of rubber, or elastomer".

The Tg of an elastomer, if referred to herein, refers to an onset glass transition temperature of the rubber which can conveniently be determined by a differential scanning calorimeter at a heating rate of 10° C. per minute. For example, see ASTM D-1356-98.

A softening point of a resin, where appropriate, is determined by "Ring and Ball" ASTM No. E28.

SUMMARY AND PRACTICE OF THE INVENTION

In accordance with this invention, a tire is provided having a circumferential tread of a sulfur cured rubber composition which comprises, based on parts by weight per 100 parts by weight of rubber (phr):

(A) 100 phr of conjugated diene-containing elastomer comprised of:

(1) from about 10 to about 65 phr of carboxylated styrene/butadiene rubber (x-SBR), and (2) about 35 to about 90 phr of additional elastomer(s), (other than said carboxylated styrene/butadiene rubber), comprised of at least one of solution polymerization prepared styrene/butadiene rubber (S-SBR), or emulsion polymerization prepared styrene/butadiene rubber (E-SBR), wherein said solution polymerization prepared styrene/butadiene rubber may be a functionalized solution polymerization prepared styrene/butadiene rubber (f-S-SBR), (B) about 50 to about 150, alternately about 80 to about 130, phr of particulate reinforcing filler comprised of rubber reinforcing carbon black.

Preferably said tread rubber composition does not contain any appreciable amount of precipitated silica reinforcement (e.g. less than about 5 phr) and more preferably is exclusive of precipitated silica reinforcement.

It is intended that said rubber composition is exclusive of carboxylated nitrile rubber (x-NBR).

Where appropriate, said functionalized solution polymerized styrene/butadiene rubber (f-S-SBR) may be, for example, functionalized solution polymerized styrene/butadiene rubber (S-SBR) containing at least one functional group comprised of amine functional group, siloxy functional group, combination of amine and siloxy functional groups, combination of thiol and siloxy functional groups, combination of imine and siloxy functional groups, hydroxyl functional group, and epoxy group.

In practice, the vinyl 1,2-content of the x-SBR may range, for example, from about 20 to about 50 percent based upon its polybutadiene portion.

It should readily be understood by one having skill in the art that said tread portion of the pneumatic tire, as well as the rubber or other material in the basic carcass, which normally contains reinforcing elements in the tread region, can be compounded by methods generally known in the rubber compounding art, such as mixing the various sulfur-vulcanizable constituent rubbers with various commonly-used additive materials such as, for example, curing aids, such as sulfur, activators, retarders and accelerators, processing additives, such as oils, resins including tackifying resins, and plasticizers, fillers, pigments, stearic acid, zinc oxide, waxes, antioxidants and antiozonants and reinforcing materials, namely the aforesaid rubber reinforcing carbon black. As known to those skilled in the art, depending on the intended use of the sulfur-vulcanizable and sulfur-vulcanized materials (rubbers), the certain additives mentioned above are selected and commonly used in conventional amounts.

Such pneumatic tires are conventionally comprised of a generally toroidal-shaped carcass with an outer circumferential tread, adapted to be ground contacting, spaced beads and sidewalls extending radially from and connecting said tread to said beads.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silica, and plasticizers, fillers, pigments, fatty acid, zinc oxide, waxes, antioxidants and antiozonants and peptizing agents. As known to those skilled in the art, depending on the intended use of the sulfur-vulcanizable and sulfur-vulcanized material (rubbers), the additives mentioned above are selected and commonly used in conventional amounts.

In practice, the tire, as a manufactured article, may be prepared by shaping and sulfur curing the assembly of its components at an elevated temperature (e.g. 140° C. to about 160° C.) and elevated pressure in a suitable mold. Such practice is well known to those having skill in such art.

Typical amounts of reinforcing filler for this invention, namely rubber reinforcing carbon black, is hereinbefore mentioned. Typical amounts of processing aids, if used, may comprise, for example, about 1 to about 50 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others such as, for example, those disclosed in *The Vanderbilt Rubber Handbook*, (1978), Pages 344 through 346. Typical amounts of antiozonants may comprise, for example, about 1 to 5 phr. Typical amounts of fatty acids, if used, can comprise a combination stearic, palmitic and oleic acids, in an amount of, for example, about 0.5 to about 3 phr. Typical amounts of zinc oxide can comprise, for example, about 1 to about 5 phr. Typical amounts of waxes, if used, can comprise, for example, about 0.5 to about 3 phr. Often such wax is a microcrystalline wax.

The vulcanization is conducted in the presence of a sulfur-vulcanizing agent. Examples of suitable sulfur-vulcanizing agents include elemental sulfur (free sulfur) or sulfur donating vulcanizing agents, for example, an amine disulfide, polymeric polysulfide or sulfur olefin adducts. Preferably, the sulfur-vulcanizing agent is elemental sulfur. As known to those having skill in such art, sulfur-vulcanizing agents might be used, for example, an amount ranging from about 0.5 to about 4 phr, or even, in some circumstances, up to about 8 phr, with a range of from about 1.5 to about 2.5, sometimes from about 2 to about 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are, for example, amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives are not considered to be an aspect of the present invention which is more primarily directed to a tire with a tread rubber composition which contains carboxylated styrene/butadiene rubber and reinforcing filler as rubber reinforcing carbon black.

The mixing of the rubber composition can be accomplished by methods known to those having skill in the rubber mixing art. For example, the ingredients may be mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art.

EXAMPLE I

Experiments were undertaken to evaluate the feasibility preparing a rubber composition for use as a tire tread composed of a rubber composition containing carboxylated nitrile rubber or carboxylated styrene/butadiene rubber.

Rubber Samples A through C were prepared. Rubber Sample A was a Control rubber Sample comprised of 100 phr of emulsion polymerization prepared styrene/butadiene rubber SBR (E-SBR) without a carboxylated rubber.

Rubber Samples B and C are Experimental rubber Samples where rubber Sample B contained a carboxylated nitrile rubber (x-NBR) and Experimental rubber Sample C contained a carboxylated styrene/butadiene rubber (x-SBR).

The rubber composition samples were prepared by mixing the elastomers(s) together with reinforcing fillers and other rubber compounding ingredients in a first non-productive mixing stage (NP) in an internal rubber mixer for about 6 minutes to a temperature of about 160° C. The mixture (optionally) is then further sequentially mixed in a second non-productive mixing stage (NP) in an internal rubber mixer for about 6 minutes to a temperature of about 160° C. The resulting mixture is then mixed in a productive mixing stage (P) in an internal rubber mixer with curatives for about 2 minutes to a temperature of about 115° C. The rubber composition is cooled to below 40° C. between each of the non-productive mixing steps and between the second non-productive mixing step and the productive mixing step.

Table 1 illustrates a summary of the basic formulations, with rounded values, for Samples A through C and Table 2 reports various physical properties of for Samples A through C. The values and percentages, where appropriate, are by weight unless otherwise indicated.

TABLE 1

| Samples | Comparable A | Experimental B | Experimental C |
|---|---|---|---|
| First Non-Productive Mixing Step | | | |
| Emulsion SBR (E-SBR) rubber[1] | 100 | 50 | 50 |
| Solution SBR (S-SBR) rubber[2] | 0 | 0 | 0 |
| Carboxylated nitrile rubber (x-NBR)[3] | 0 | 50 | 0 |
| Carboxylated SBR rubber (x-SBR)[4] | 0 | 0 | 50 |
| Carbon black[5] | 127 | 127 | 127 |
| Processing oil[6] | 95 | 95 | 95 |
| Fatty acid[7] | 5 | 5 | 5 |
| Antidegradant[8] | 2 | 2 | 2 |
| Zinc oxide | 5 | 5 | 5 |

TABLE 1-continued

|  | Comparable | Experimental | |
|---|---|---|---|
| Samples | A | B | C |
| Productive Mixing Step | | | |
| Sulfur | 1 | 1 | 1 |
| Accelerator(s)[9] | 5 | 5 | 5 |

[1] Emulsion polymerization prepared styrene/butadiene elastomer (E-SBR) as Afpol 1721 ™ from Kabochem containing about 40 percent bound styrene and having a Tg of about −35° C.
[2] Solution polymerization prepared styrene/butadiene elastomer (S-SBR) as Solflex 30H41 ™ from The Goodyear Tire & Rubber Company, having a bound styrene of about 30 percent and a vinyl 1,2- content, based upon its butadiene content, of about 41 percent and an onset Tg of about −20° C.
[3] Carboxylated nitrile rubber as Krynac X750 ™ from Lanxess
[4] Carboxylated styrene/butadiene rubber (x-SBR) as Buna PBR4003 ™ from Lanxess
[5] N330 rubber reinforcing carbon black, an ASTM designation
[6] Rubber processing oil, paraffinic type
[7] A combination of fatty acids comprised of stearic, palmitic and oleic acids
[8] Of the amine type
[9] Sulfenamide sulfur vulcanization accelerator The following Table 2 reports data for various physical properties of the rubber Samples A through C.

TABLE 2

|  | Comparable | Experimental | |
|---|---|---|---|
| Samples | A | B | C |
| Emulsion SBR (E-SBR) rubber | 100 | 50 | 50 |
| Solution SBR (S-SBR) rubber | 0 | 0 | 0 |
| Cis 1,4-polyisoprene rubber | 0 | 0 | 0 |
| Carboxylated nitrile rubber (x-NBR) | 0 | 50 | 0 |
| Carboxylated SBR rubber (x-SBR) | 0 | 0 | 50 |
| Stress-Strain[1] | | | |
| Tensile strength (MPa) | 8.8 | 4.1 | 8.7 |
| Elongation at break (%) | 701 | 259 | 673 |
| 300% modulus, ring (MPa) | 2.93 | 0* | 3.32 |
| RPA[2], 100° C., 1 Hz | | | |
| Storage modulus (G') at 1% strain (MPa) | 1.17 | 1.25 | 1.27 |
| Tan delta at 10% strain | 0.44 | 0.63 | 0.46 |
| Loss modulus (J")[3], 100° C., 11 Hertz, 1% strain (1/GPa) | 19.6 | 21.6 | 25.4 |
| Hot Rebound (%), 100° C. | 25 | 15 | 25 |
| Hardness (Shore A)[4], 23° C. | 62 | 77 | 61 |

*The rubber sample broke before reaching 300 percent elongation
[1] Data obtained with Tensile Tester Zwick 1445 instrument
[2] Data obtained according to RPA 2000 ™ Rubber Process Analyzer
[3] Rheometrics RSA III analytical instrument
[4] Shore A hardness, ASTM D-1415

From Table 2 it is seen from Experimental rubber Sample C that the use of the combination of Emulsion SBR (E-SBR) and carboxylated SBR resulted in significant increase in 300% modulus and Loss Modulus (J") values without significantly affecting the remainder of indicated physical properties as compared to Control rubber Sample A which used the E-SBR rubber without the carboxylated SBR. This is indicative of a very large and significant contribution of increased grip, or dry traction, for a tire with a tread of such rubber composition, also with a predictive equivalent or improved resistance to tread wear.

In contrast, from Table 2 it is seen from Experimental rubber Sample B that use of the combination of E-SBR with the carboxylated nitrile rubber resulted in a very large detrimental effect in a sense of a large and significant reduction in tensile strength, ultimate elongation and hot rebound properties as compared to Control rubber Sample A as well as the aforesaid Experimental rubber Sample C. Accordingly, this is indicative of significantly reduced strength and durability for a tire tread of such rubber composition.

Therefore, it is concluded that the inclusion of the carboxylated styrene/butadiene elastomer (x-SBR) in the carbon black reinforced SBR-based rubber composition provided a significant and beneficial discovery of significantly improved grip, or dry traction, with an additional observed discovery of indicative increased resistance to treadwear as compared to use of a carboxylated nitrile rubber (x-NBR) in the carbon black reinforced rubber composition. This is considered herein to be a significant departure from past practice.

EXAMPLE II

Experiments were undertaken to evaluate the feasibility preparing a rubber composition for use as a tire tread composed of a silica-rich rubber composition which contains the aforesaid beneficial carboxylated styrene/butadiene rubber.

Use of the carboxylated nitrile rubber was not undertaken in view of the aforesaid significantly beneficial results observed by use of the carboxylated styrene/butadiene rubber shown in Example I and observed comparative detrimental effect attributed to the presence of the carboxylated nitrile rubber (x-NBR) in the rubber composition.

Natural cis 1,4-polyisoprene rubber was included in the rubber composition to promote an increase in tear strength and to decrease glass transition temperature (Tg) of the rubber composition.

For this Example, rubber Samples D and E were prepared.

Rubber Sample D was considered as being a Control rubber Sample in a sense that it contained precipitated silica without rubber reinforcing carbon black and without the carboxylated styrene/butadiene rubber (x-SBR).

Rubber Sample E was an Experimental rubber Sample which contained carboxylated styrene/butadiene rubber (x-SBR) with the precipitated silica reinforcement.

The rubber composition samples were prepared by mixing the elastomers(s) together with reinforcing fillers and other rubber compounding ingredients in a first non-productive mixing stage (NP) in an internal rubber mixer for about 6 minutes to a temperature of about 160° C. The mixture (optionally) is then further sequentially mixed in a second non-productive mixing stage (NP) in an internal rubber mixer for about 6 minutes to a temperature of about 160° C. The resulting mixture is then mixed in a productive mixing stage (P) in an internal rubber mixer with curatives for about 2 minutes to a temperature of about 115° C. The rubber composition is cooled to below 40° C. between each of the non-productive mixing steps and between the second non-productive mixing step and the productive mixing step.

Table 3 illustrates the basic formulations for Samples D and E and Table 4 reports various physical properties of for Samples D and E. The values and percentages, where appropriate, are by weight unless otherwise indicated.

TABLE 3

|  | Control | Experimental |
|---|---|---|
| Samples | D | E |
| First Non-Productive Mixing Step | | |
| Solution SBR (S-SBR) rubber[2] | 30 | 30 |
| Natural cis 1,4-polyisoprene rubber | 70 | 50 |
| Carboxylated SBR rubber[4] | 0 | 20 |
| Processing oil[6] | 3 | 3 |
| Fatty acid[7] | 2 | 2 |
| Antidegradant[8] | 4 | 4 |

TABLE 3-continued

| Samples | Control D | Experimental E |
|---|---|---|
| Zinc oxide | 3 | 3 |
| Precipitated silica[10] | 40 | 40 |
| Silica coupler composite[11] | 3.6 | 3.6 |
| Productive Mixing Step | | |
| Sulfur | 1.6 | 1.6 |
| Accelerator(s)[9] | 1.8 | 1.8 |

[2]Solution polymerization prepared styrene/butadiene elastomer (S-SBR) as Solflex 30H41 ™ from The Goodyear Tire & Rubber Company, having a bound styrene of about 30 percent and a vinyl 1,2- content, based upon its butadiene content, of about 41 percent and an onset Tg of about −20° C.
[4]Carboxylated styrene/butadiene rubber (C-SBR) as Buna PBR4003 ™ from Lanxess
[5]N330 rubber reinforcing carbon black, an ASTM designation
[6]Rubber processing oil, paraffinic type
[7]Combination of fatty acids comprised of stearic, palmitic and oleic acids
[8]Of the amine type
[9]Sulfenamide sulfur vulcanization accelerator
[10]Precipitated silica as Zeosil ™ 1165MP from Rhodia
[11]Silica coupler composite as a composite comprised of a combination of silica coupler comprised of bis(3-triethoxysilylpropyl) polysulfide, having an average of connecting sulfur atoms in its polysulfidic bridge in a range of from about 3.5 to about 4, and carbon black in a 50/50 weight ratio obtained as X50S from Degussa and reported in the Table as the composite which is therefore 50 percent active insofar as the coupling agent is concerned.

The following Table 4 reports data for various physical properties of the rubber Samples D and E.

TABLE 4

| Samples | Control D | Experimental E |
|---|---|---|
| Solution SBR (S-SBR) rubber | 30 | 30 |
| Natural cis 1,4-polyisoprene rubber | 70 | 50 |
| Carboxylated SBR (x-SBR) rubber | 0 | 20 |
| Precipitated silica | 40 | 40 |
| Stress-Strain[1] | | |
| Tensile strength (MPa) | 21 | 20 |
| Elongation at break (%) | 620 | 593 |
| 300% modulus, ring (MPa) | 7.56 | 7.55 |
| RPA[2], 100° C., 1 Hz | | |
| Storage modulus (G') at 1% strain (MPa) | 1.50 | 1.20 |
| Tan delta at 10% strain | 0.06 | 0.05 |
| Loss modulus (J")[3], 100° C., 11 Hertz, 1% strain (1/MPa) | 0.065 | 0.050 |
| Hot Rebound (%), 100° C. | 70 | 71 |
| Hardness (Shore A)[4], 23° C. | 57 | 56 |

[1]Data obtained with Tensile Tester Zwick 1445 instrument
[2]Data obtained according to RPA 2000 ™ Rubber Process Analyzer
[3]Rheometrics RSA III analytical instrument
[4]Shore A hardness, ASTM D-1415

From Table 4 it is seen from Experimental rubber Sample E that use of a combination of solution SBR (S-SBR), carboxylated SBR (x-SBR) elastomers, with the included natural rubber, together with precipitated silica reinforcement was observed to result in similar tensile strength, 300 percent modulus and hot rebound properties as the Control rubber Sample D. However, the Experimental rubber Sample E exhibited a significant reduction (reduction of about −17 percent) in the tan delta value and reduction (reduction of about −23 percent) in the loss modulus (J") value as compared to Control rubber Sample D which is indicative of decreased hysteresis for the rubber composition and decreased dry traction for a tread of such rubber composition.

Therefore, it is considered herein that replacement of rubber reinforcing carbon black by the precipitated silica, together with its coupling agent, in the carboxylated styrene/butadiene (x-SBR) containing rubber composition did not satisfactorily achieve an increase of tan delta value (indicative of increased hysteresis) of the rubber composition as well as an increase in grip, or dry traction, properties, as compared to the inclusion of rubber reinforcing carbon black reinforcement, for a tire with tread of such rubber composition.

In further accordance with this invention, said tread rubber composition may also contain at least from about 6 to about 30 phr of one and desirably a plurality of at least two resins, particularly two to four resins, with individual spaced apart softening points of at least 30° C., with each resin being present in an amount of at least about two parts by weight to promote tread traction (skid resistance) over a wide range of operating temperatures. Such resins may be comprised of at least one of:

(A) coumarone-indene resin(s),
(B) alkylated hydrocarbon resin(s),
(C) aromatic petroleum hydrocarbon resin(s), and
(D) dicyclopentadiene/diene resin(s).

For example, a first resin may have a softening point within a range of from about 20° C. to about 110° C., a second resin, if used, may have, for example, a softening point within a range of from about 70° C. to about 140° C. and at least 30° C. higher than that of said first resin. If a third resin is used, it may have, for example, a softening point within a range of from about 100° C. to about 170° C. and at least 30° C. higher than of said second resin. For a further example, two or more resins may be used of the same general resin composition (e.g. coumarone-indene resins) which have the spaced apart softening points of at least 30° C.

It is envisioned that as the resin softens, the cured rubber compound containing the resin becomes hysteretic. This means the rubber compound transfers the energy generated in the tread as it rolls into heat, which in turn results in improved traction performance.

Representative of a coumarone-indene resin having a softening point range of about 20° C. to 40° C., (although a coumarone-indene resin may have a much higher softening point) may be, for example, Cumar R-29 from Neville Chemical Co.

For example, for an alkylated petroleum hydrocarbon resin in about a 120° C. to 150° C. softening point range, primarily saturated alkylated resins are contemplated such as, for example, Nevchem 150 by Neville Chemical Co. Such resins might be prepared, for example, by the alkylation of aromatic hydrocarbons with dicyclopentadiene (see U.S. Pat. No. 3,023,200).

For example, for an aromatic petroleum hydrocarbon resin in an intermediate softening point range of about 90° C. to about 110° C., a resin such as LX-782 by Neville is contemplated. In one aspect, such resins contain carbon-to-carbon unsaturation (double bonds) and may conventionally be a mixture of aromatic and acyclic polymer moieties, although they may be referred to as 'aromatic petroleum resins". The aromatic component of the resin is preferably selected from styrene, alpha-methylstyrene or t-butyl styrene and the remaining component of the resin is an aliphatic hydrocarbon. Such class of resins are believed to be recognized as such by those having a skill in such resin art.

In one aspect of the invention, a dicyclopentadiene/diene resin composition is contemplated as the reaction product of the polymerization reaction between dicyclopentadiene and at least one olefin hydrocarbon (a diene) copolymerizable therewith which has 4 to 12 carbon atoms and which is selected from monolefins and diolefins. While various diolefins are contemplated, including limonene and cyclooctadiene, cyclooctadiene is preferred. Preferably, such dicyclopentadiene-olefin copolymer is comprised of about 50 to about 80 weight percent dicyclopentadiene. Such resin is contemplated which has a softening point in a range of about 20° C.

to about 170° C. or even up to about 220° C. Thus, on a preferable basis, for example, a dicyclopentadiene/cyclooctadiene copolymer resin composed of about 50 to about 80 weight dicyclopentadiene is contemplated.

Representative of such various dicyclopentadiene/diene resins are shown in U.S. Pat. No. 3,927,144 and, for such disclosure, is hereby incorporated herein by reference.

While various embodiments are disclosed herein for practicing the invention, it will be apparent to those skilled in this art that various changes and modifications may be made therein without departing from the spirit or scope of the invention.

What is claimed is:

1. A tire having a circumferential tread of a sulfur cured rubber composition which comprises, based on parts by weight per 100 parts by weight of rubber (phr):
    (A) 100 phr of conjugated diene-containing elastomers consisting of:
        (1) from about 10 to about 65 phr of carboxylated styrene/butadiene rubber (x-SBR), and
        (2) about 35 to about 90 phr of additional elastomer(s), consisting of at least one of solution polymerization prepared styrene/butadiene rubber (S-SBR), or emulsion polymerization prepared styrene/butadiene rubber (E-SBR) or functionalized solution polymerized styrene/butadiene rubber (f-S-SBR) consisting of solution polymerization prepared styrene/butadiene rubber (S-SBR) containing at least one functional group comprised of amine functional group, siloxy functional group, combination of amine and siloxy functional groups, combination of thiol and siloxy functional groups, combination of imine and siloxy functional groups, hydroxyl functional group, and epoxy group,
    (B) about 50 to about 150 phr of particulate reinforcing filler consisting of rubber reinforcing carbon black,
    wherein said tread rubber composition is exclusive of silica reinforcement,
    wherein said tread rubber composition is exclusive of carboxylated nitrile rubber (x-NBR), and
    wherein, said rubber composition contains rubber reinforcing carbon black in a range of from about 80 to about 130 phr.

2. The tire of claim 1 wherein said additional elastomer consists of a solution polymerization prepared styrene/butadiene rubber (S-SBR) and is exclusive of a functionalized solution polymerization prepared styrene/butadiene rubber (f-S-SBR).

3. The tire of claim 1 wherein said additional elastomer consists of an emulsion polymerization prepared styrene/butadiene rubber (E-SBR) and is exclusive of a functionalized solution polymerization prepared styrene/butadiene rubber (f-S-SBR).

4. The tire of claim 1 wherein said additional elastomer consists of solution polymerization prepared styrene/butadiene rubber (S-SBR), and functionalized solution polymerization prepared functionalized styrene/butadiene rubber (f-S-SBR),
    wherein said f-S-SBR contains at least one functional group comprised of amine functional group, siloxy functional group, combination of amine and siloxy functional groups, combination of thiol and siloxy functional groups, combination of imine and siloxy functional groups, hydroxyl functional group, and epoxy group.

5. The tire of claim 1 wherein said tread rubber composition further contains a plurality of from about 6 to about 30 phr of resins with individually spaced apart softening points of at least about 30° C., with each resin being present in an amount of at least about 2 parts by weight and having softening points (Ring and Ball) in a range of about 20° C. to about 170° C., wherein said resins are comprised of at least one of:
    (A) coumarone-indene resin(s),
    (B) alkylated hydrocarbon resin(s),
    (C) aromatic petroleum hydrocarbon resin(s), and
    (D) dicyclopentadiene/diene resin(s).

6. The tire of claim 2 wherein said tread rubber composition further contains a plurality of from about 6 to about 30 phr of resins with individually spaced apart softening points of at least about 30° C., with each resin being present in an amount of at least about 2 parts by weight and having softening points (Ring and Ball) in a range of about 20° C. to about 170° C., wherein said resins are comprised of at least one of:
    (A) coumarone-indene resin(s),
    (B) alkylated hydrocarbon resin(s),
    (C) aromatic petroleum hydrocarbon resin(s), and
    (D) dicyclopentadiene/diene resin(s).

7. The tire of claim 3 wherein said tread rubber composition further contains a plurality of from about 6 to about 30 phr of resins with individually spaced apart softening points of at least about 30° C., with each resin being present in an amount of at least about 2 parts by weight and having softening points (Ring and Ball) in a range of about 20° C. to about 170° C., wherein said resins are comprised of at least one of:
    (A) coumarone-indene resin(s),
    (B) alkylated hydrocarbon resin(s),
    (C) aromatic petroleum hydrocarbon resin(s), and
    (D) dicyclopentadiene/diene resin(s).

* * * * *